United States Patent [19]
Vasiliev et al.

[11] Patent Number: 6,077,580
[45] Date of Patent: Jun. 20, 2000

[54] COMPOSITE SHELL SHAPED AS A BODY OF REVOLUTION AND A METHOD OF FORMING THE SAME

[75] Inventors: Valery Vitalievich Vasiliev; Vladimir Alexeevich Salov; Oleg Vladimirovich Salov, all of Moscow, Russian Federation

[73] Assignees: Center Perspektivnykh Razrabotok, Russian Federation; McDonnell Douglas Corporation, Huntington Beach, Calif.

[21] Appl. No.: 08/882,853

[22] Filed: Jun. 26, 1997

[30] Foreign Application Priority Data

Jul. 1, 1996 [RU] Russian Federation ........... 961288125
Jul. 1, 1996 [RU] Russian Federation ........... 961288325
Jul. 1, 1996 [RU] Russian Federation ........... 961288725

[51] Int. Cl.$^7$ ..................................................... B32B 1/08
[52] U.S. Cl. ..................... 428/36.3; 428/367; 428/368; 428/374; 428/376; 428/377; 428/408
[58] Field of Search .................................. 428/36.3, 373, 428/374, 375, 376, 377, 367, 368, 408

[56] References Cited

U.S. PATENT DOCUMENTS

| | | | |
|---|---|---|---|
| 3,047,191 | 7/1962 | Young | 220/83 |
| 3,083,864 | 4/1963 | Young | 220/83 |
| 3,303,079 | 2/1967 | Carter | 156/172 |
| 3,841,197 | 10/1974 | Morrisey | 89/1.816 |
| 4,137,354 | 1/1979 | Mayes, Jr. et al. | 428/116 |
| 4,284,679 | 8/1981 | Blad et al. | 428/218 |
| 4,469,138 | 9/1984 | Satoh | 138/174 |
| 4,530,379 | 7/1985 | Policelli | 138/109 |
| 5,006,291 | 4/1991 | Fish | 264/103 |
| 5,552,197 | 9/1996 | Bettinger | 428/34.9 |
| 5,744,237 | 4/1998 | Stanhope | 428/373 |

FOREIGN PATENT DOCUMENTS 02290797A 10/1989 Japan.

OTHER PUBLICATIONS

Polymer Science Dictionary, Second Edition, Chapman & Hill, pp. 196–197 and 180–181, 1997.
D.V. Rosato, Filament Winding: its development, manufacture, applications, and design, *Interscience Publishers*, 1969, pp. 188–191, 207–220, with translation.
V.V. Ragulin, Technology of Tyre Production, *Chemistry Publishing House*, Moscow, 1975, pp. 93,96, with translation.
A. Kelly, Strong Solids, *Mir Publishers*, Moscow, 1976, pp. 202–206, with translation.
I.F. Obraztsov, et al., Optimum Reinforcement Of Composite Shells Of Revolution, *Mashinostroenie (Machine Building Publishers)*, 1977, pp. 19–29.
Specification To Inventor's Certificate No. 763646, published Sep. 20, 1980, with translation.

*Primary Examiner*—Ellis Robinson
*Assistant Examiner*—John J. Figueroa
*Attorney, Agent, or Firm*—Alston & Bird LLp

[57] ABSTRACT

The invention relates as a whole to composite structures and methods of forming thereof and can be used in particular, in the manufacture of bodies and compartments of flying vehicles used in rocketry and aeronautics.

A composite shell shaped as a body of revolution comprises a plurality of multilayer elements forming its structure consisting of a set of crisscrossing strips. Said strips are made of a plurality of fibers formed as a "skin-core" structure and impregnated with a thermoplastic or resilient-elastic binder. The fibers formed as a "skin-core" structure are produced by impregnating the fiber filaments with a thermosetting binder and curing it. Multilayer air-tight shells and multilayer shells of a rib-cellular structure can be produced from said strips (FIG. 1, FIG. 10).

14 Claims, 4 Drawing Sheets

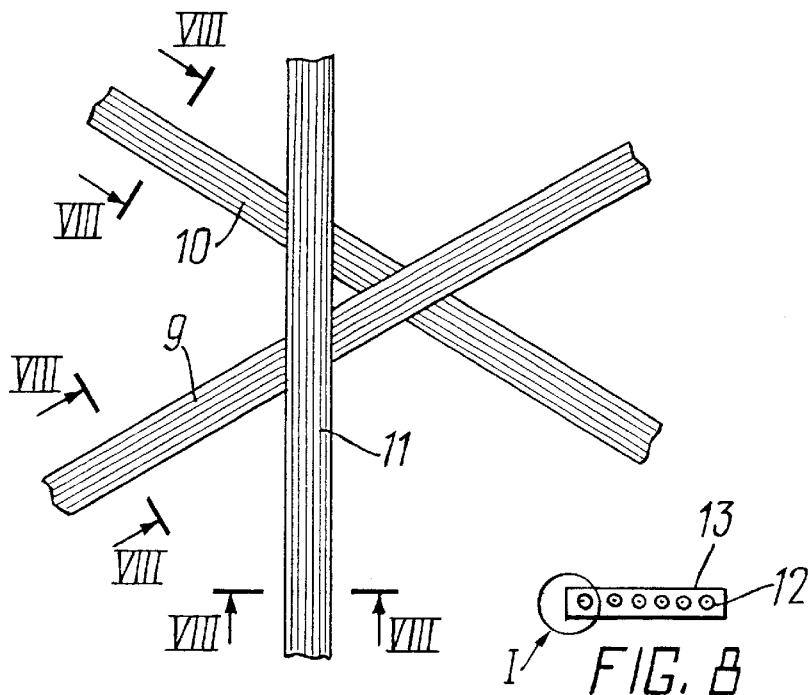
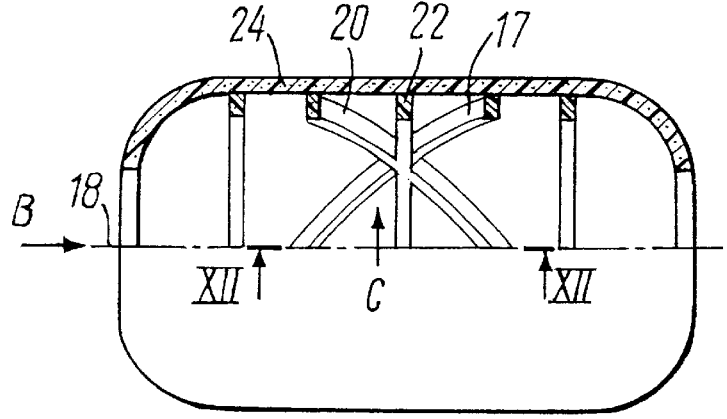

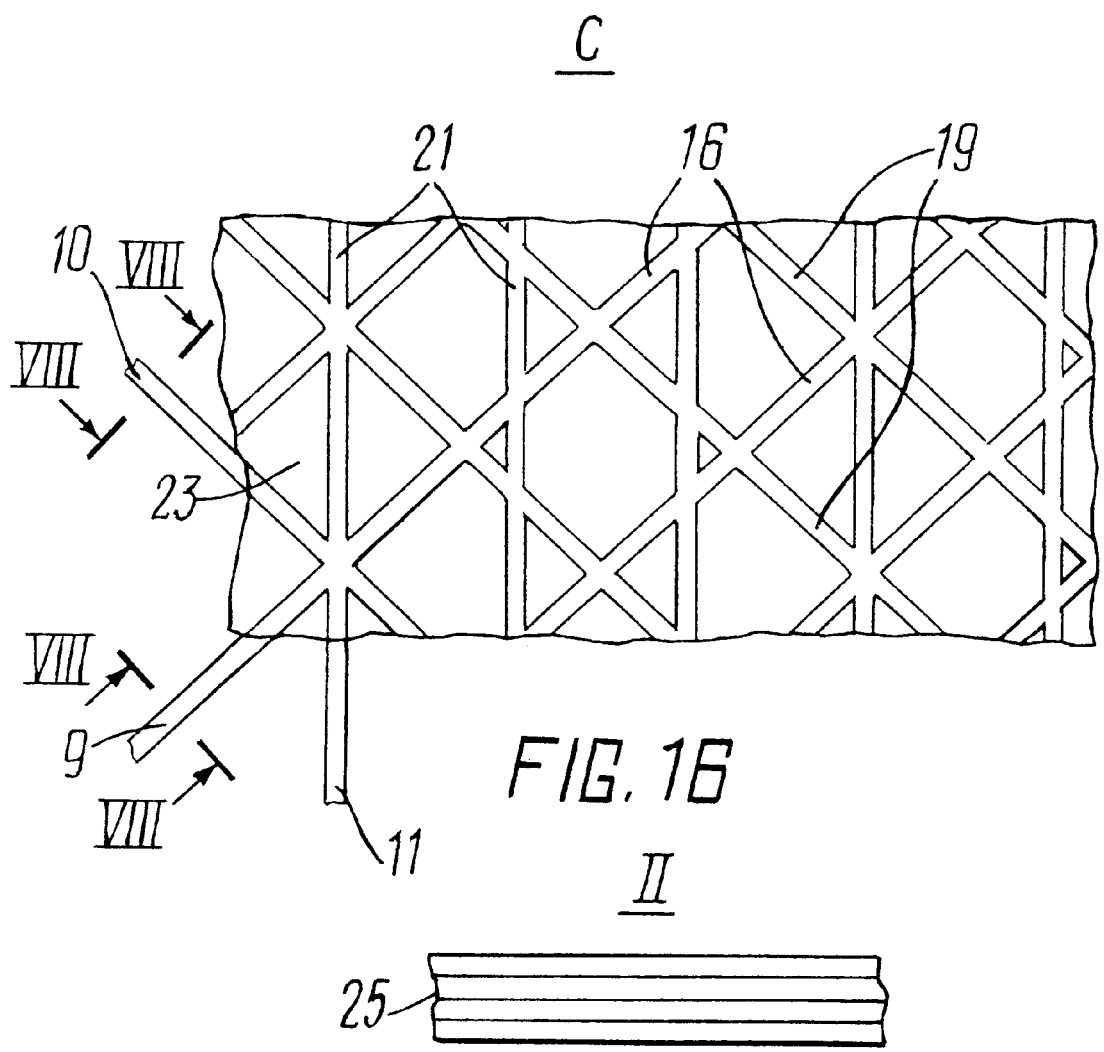

6,077,580

COMPOSITE SHELL SHAPED AS A BODY OF REVOLUTION AND A METHOD OF FORMING THE SAME

BACKGROUND OF THE INVENTION

The invention relates as a whole to composite structures and methods of forming thereof and can be used in particular, in the manufacture of bodies and compartments of flying vehicles used in rocketry and aeronautics.

Stringent requirements are imposed upon composite shells shaped as a body of rotation in what concerns their air-tightness, strength and reliability, and these products must therewith possess minimum weight. However, in solving the problems of air-tightness with a simultaneous reduction in weight, there arises a problem of premature destruction of products. Therefore, various sealing interlayers are included in the composite shells shaped as a body of rotation.

A composite shell is designed so as to take into account that a binder in a composite material of the product acts as a medium uniformly transmitting stresses in all directions, the maximum allowable strains of the binder being higher than those of fibers. Utilization of a suitable binder which has a substantially lower modulus of elasticity than the fibers ensures that a fiber will be destructed, not the binder, thus maximum efficiency will be provided for the selected structure (D. V. Rosato, K. S. Grove, Glass Fiber Winding, Moscow, Mashinostroienie Publishing House, 1969, pp. 188–191, 207–220).

In order to improve binding of fibers with the matrix-binder, they are impregnated with a latex compound (V. V. Ragulin "Technology of Tire Production", 2-nd Ed., Moscow, Khimia Publishing House, 1975, pp. 93, 96).

However, these solutions are not sufficient, fibers are destructed prematurely.

As shown by tests, destruction of a composite is influenced by differences in fiber orientation and by tangential stresses emerging between layers (A. Kelly, High-Strength Materials, Moscow, Mir Publishing House, 1976, pp. 202–206).

The phenomenon of binder destruction in the process of straining takes place because of brittle failure of layers tensioned across fibers, which leads to a substantial reduction in the rigidity of material. Integrity of a composite material deteriorates under loads rather far from breaking ones. Cracking of the binder affects the characteristics of fatigue strength and leads to a number of other undesirable effects, among other things, to a loss of air-tightness. Incorporation of a protective coating increases the product weight (I. F. Obraztsov, V. V. Vasiliev, V. A. Bunakov, Optimal Reinforcement of Composite Shells of Revolution, Moscow, Mashinostroienie Publishing House, 1977, pp. 19–25, 125).

The same shortcomings are mentioned, as a result of shell tests, also in another reference. In loading, the binder soon begins to crack, and there begins a leak of medium because of delaminations (A. Kelly, High-Strength Materials, Moscow, Mir Publishing House, 1976, pp. 202–206).

In high-strength shells (U.S. Pat. No. 3,047,191, U.S. Cl. 220–83, publ. 1962) the number of spirally and annularly wound layers is selected to suit the condition of uniform wall strength by varying the angle of laying the spirals of strips to obtain the predetermined reinforcement structure.

In high-strength composite shells, as shown in French Application No. 2310517, IPC F16L 9/12, publ. 1977 in order to improve interlayer strength, use is made of glass fabric layers.

In U.S. Pat. No. 4,469,138, U.S. Cl. 238-174, publ. 1984 this problem is solved due to incorporation of a modified thermoplastic to ensure better cooperation with reinforcing fibers.

In a known composite shell shaped as a body of revolution as disclosed in U.S. Pat. No. 4,530,379, U.S. Cl. 138-109, publ. 1985, which is made of layers repeating throughout the thickness of its wall and consisting of systems of crisscrossed spiral and annular strips of unidirectional fibers bound by cured polymer binder, the annular strips are arranged at an angle of 80–90° to the shell axis, and the spiral strips, at an angle of 5–75°. As shown by results gained in tests of similar shells, their interlayer strength remains an unsolved problem.

Similar effects of premature destruction are revealed in tests of shells having a rib-cellular structure.

In U.S. Pat. No. 3,083,864, U.S. Cl. 220–83, publ. 1963 composite shells shaped as bodies of revolution formed of layers repeating throughout the thickness of its wall and consisting of systems of crisscrossed spiral and annular strips of unidirectional fibers bound by polymer binders have inadequate strength.

In U.S. Pat. No. 4,284,679, U.S. Cl. 428-218, publ. 1978 and U.S. Pat. No. 4,137,354, U.S. Cl. 428-116, publ. 1979, shells are described which are formed of layers repeating throughout the thickness of its wall and consisting of systems of crisscrossed spiral and annular strips, with stiffening ribs, with outer coating, made respectively of unidirectional fibers bound by a polymer binder, but they have inadequate rigidity.

The shells of a composite material according to USSR Inventor's Certificate No. 763646, Int. Cl. F17C 1/00, publ. 1980 are not provided with adequate solidity, and this reduces their strength.

Methods of forming composite shell are also known in prior art to comprise the steps of impregnating fibers with a binder, laying fiber strands as strips on a mandrel at various angles of inclination to the axis of its rotation so as to form carrying layers, heat treating to cure the binder, and removing the mandrel, as described in U.S. Pat. No. 3,047,191, U.S. Cl. 220–83, publ. 1962, and U.S. Pat. No. 3,083,864, U.S. Cl. 220–83, publ. 1963.

In forming high-strength shells, sealing layers are incorporated beneath the layers wound of reinforcing fibers, as shown in French Patent No. 1,414,309, Int. Cl. 8640, and U.S. Pat. No. 3,303,079, U.S. Cl. 156–72, publ. 1967.

According to U.S. Pat. No. 5,006,291, U.S. Cl. 264-103, publ. 1991, after layers are wound of strips consisting of unidirectional fibers impregnated with a binder, the layers are impregnated additionally.

Japanese Application No. 2-290797, Int. Cl. 8648 1/08, publ. 1990 discloses incorporation of rigid, strong and air-tight rubber which is applied to the mandrel prior to winding layers of strips impregnated with a binder, improving thereby strength and reliability of the product, but its weight is increased.

BRIEF DESCRIPTION OF THE INVENTION

The main object of the present invention is to create composite shells shaped as a body of revolution and a method of forming the same, which, when implemented, could have ensured the most complete cooperation of elastic properties of fibers and binder without their destruction up to the maximum limits possible and eliminated the shortcomings of analogous and prior art revealed.

The main result which can be attained when implementing and using the disclosed technical solutions is in improvement of strength, air-tightness and reliability of composite shells, reduction of their weight, decrease of their safety factor to a minimum stable value, ensuring high quality of their forming, and reducing consumption of materials and power.

The main object and technical result are accomplished owing to a different approach to creating the interaction of forces between reinforming fiber and polymer binder in the composite structure of the shell such that shear stresses and strains do not lead to a premature destruction of fibers in the transverse direction. This is accomplished by securing filaments in a fiber and coating the fiber with a high-strength high-rigidity binder, and the strips of such fibers, with a more resilient binder, so that no transverse and interlayer destructions of the composite material will take place.

This new concept allows to produce various multiple-layer shell structures. Two embodiments of multilayer shells are described in this application.

A composite shell shaped as a body of revolution comprises a first plurality of multilayer elements arranged along spatial spirals and having a common axis and the same direction; a second plurality of multilayer elements arranged along spatial spirals and having a common axis essentially coinciding with said axis of said spatial spirals of said first plurality of multilayer elements, and the same direction opposite to said direction of said spatial spirals of said first plurality of multilayer elements; a third plurality of multilayer elements arranged along circumferences which have the centers thereof essentially lying on said axis of said spatial spirals of said first plurality of multilayer elements; a multilayer structure consisting of said first, second and third pluralities of multilayer elements and formed by a set of strips, each strip of said set of strips is formed of a plurality of unidirectional fibers bound by a polymer binder, each unidirectional fiber of each strip of said set of strips is made as a "skin-core" structure.

The skin of each unidirectional fiber made as a "skin-core" structure in each strip of said set of strips which forms the multilayer structure of said first, second and third pluralities of multilayer elements is made of a thermoset epoxy-containing binder; the core of each unidirectional fiber made as a "skin-core" structure in each strip of said set of strips which forms the multilayer structure of said first, second and third pluralities of multilayer elements is made of high-modulus fibers. The unidirectional fiber made as a "skin-core" structure in each strip of said set of strips which forms the multilayer structure of said first, second and third pluralities of multilayer elements is made to have a core-to-skin volume ratio from 1:0.3 to 1:0.45. The polymer binder which binds the plurality of unidirectional fibers made as a "skin-core" structure in each strip of said set of strips which forms the multilayer structure of said first, second and third pluralities of multilayer elements is a thermoplastic binder of thermoplast type or a resilient-elastic binder of rubber or polyurethane type. The unidirectional fibers made as a "skin-core" structure in each strip of said set of strips which forms the multilayer structure of said first, second and third pluralities of multilayer elements, and the polymer binder which binds them and is a thermoplastic binder of thermoplast type or a resilient-elastic binder of rubber or polyurethane type are made to have a volume ratio of 1:0.3 to 1:0.45.

In another composite shell shaped as a body of revolution and having a multilayer rib-cellular structure, a first, a second and a third plurality of multilayer elements are arranged along spatial spirals at intervals. The unidirectional fibers made as a "skin-core" structure and the polymer binder of thermoplast type or the resilient-elastic binder of rubber or polyurethane type in the rib-cellular structure are made to have a volume ratio of 1:1 to 1:1.2. Said shell has an outer coating on said rib-cellular structure formed by a fourth plurality of multilayer elements made of a set of strips and of a plurality of unidirectional fibers made as a "skin-core" structure and bound by a polymer binder which is a thermoplastic binder or a resilient-elastic binder of thermoplast type and rubber or polyurethane type, respectively. The skin of the fiber made as a "skin-core" structure is made of a thermoset epoxy-containing binder, and the core—of high-modulus fibers. A core-to-skin volume ratio for the fibers of the rib-cellular structure and said outer coating ranges from 1:0.3 to 1:0.45. A volume ratio of the fibers made as a "skin-core" structure and the thermoplastic or resilient-elastic binder for the outer coating ranges from 1:0.3 to 1:0.45.

A method of forming a composite shell shaped as a body of revolution comprises the steps of forming unidirectional fibers, forming a strip, forming a workblank, and forming the shell, wherein the unidirectional fibers are formed as a "skin-core" structure with the use of high-modulus fibers as the core, the skin of the fibers is formed by applying a thermoset epoxy-containing binder, with the weight thereof equal to 30–45% of the weight of the high-modulus fibers, and curing thereof on the fibers in accordance with the temperature conditions for polymerization of the epoxy-containing binder. The strip is produced by forming it of a plurality of unidirectional fibers formed as a "skin-core" structure and by applying thereto a thermoplastic binder of rubber or polyurethane type, with the weight thereof equal to 30–45% of the weight of the strip formed of a plurality of unidirectional fibers formed as a "skin-core" structure for the layers in the shell of multilayer structure. The shell is formed by winding on a mandrel a first, a second and a third pluralities of multilayer elements so as to form its multilayer structure consisting of the strips with a thermoplastic binder of thermoplast type or a resilient-elastic binder of rubber or polyurethane type applied to their unidirectional fibers formed as a "skin-core" structure, wherein the first plurality of multilayer elements is oriented along spirals having the same direction, and the second plurality of multilayer elements is oriented along spirals having the same direction opposite to said direction of said spirals of the first plurality of multilayer elements. The third plurality of multilayer elements is wound along circumferences. The multilayer structure of the shell is heat treated in accordance with the temperature conditions for said polymer binder—thermoplast, rubber or polyurethane with which the fibers formed as a "skin-core" structure are impregnated. Next the mandrel is removed.

The method described above allows to produce air-tight and high-strength shells.

For producing shells of rib-cellular structure, another embodiment of the method is disclosed.

A method of forming a composite shell shaped as a body of revolution comprises the steps of forming fibers, forming a strip, forming a rib-cellular structure, and forming an outer coating. Wherein, the unidirectional fibers are formed as a "skin-core" structure with the use of high-modulus fibers as the core, the skin of the fibers is formed by applying a thermoset epoxy-containing binder, with the weight thereof equal to 30–45% of the weight of the high-modulus fibers, and curing thereof on the fibers in accordance with the temperature conditions for polymerization of the epoxy-containing binder. The strip is produced by forming it of a plurality of unidirectional fibers formed as a "skin-core" structure and by applying thereto a thermoplastic binder of rubber or polyurethane type, with the weight thereof equal to 50–83% of the weight of the strip formed of a plurality of unidirectional fibers formed as a "skin-core" structure for the rib-cellular structure of the shell which is formed by winding on a mandrel a first, a second and a third pluralities of multilayer elements, but so that there are intervals between oppositely direct spirals and the circumferences along which the strips are arranged. In doing so, the first plurality of multilayer elements is oriented along spirals having the same direction, and the second plurality of multilayer elements is oriented along spirals having the same direction opposite to said direction of said spirals of the first plurality of multilayer elements. The third plurality of multilayer elements is wound along circumferences to produce the multilayer rib-cellular structure of the shell. Next, a fourth plurality of multilayer elements is applied to the rib-cellular structure of the shell to form an outer coating made of a set of strips each of which is formed by a plurality of unidirectional fibers formed as a "skin-core" structure and bound by a polymer binder which is a thermoplastic binder of thermoplast type or a resilient-elastic binder of rubber or polyurethane type, with the weight thereof equal to 30–45% of the weight of the unidirectional fiber formed as a "skin-core" structure. The resulting shell of rib-cellular structure with an outer coating is heat treated in accordance with the conditions for the polymer binder which is essentially a thermoplastic binder or a resilient-elastic binder of rubber or polyurethane type, and the mandrel is then removed out of the resulting shell.

The method described above allows to produce a shell of rib-cellular structure featuring improved strength and rigidity characteristics and resistant to influence of axial compressive loads.

The distinguishing features of the composite shells shaped as bodies of revolution and the methods of forming the same are essential features, since each of them separately and all of them together are directed towards solving the problem raised and accomplishing the new technical result. Forming of unidirectional fibers as a rigid "skin-core" structure which has high-modulus fibers in the core and a cured thermoset binder in the skin, and forming of shells from them on the basis of subsequent application of a thermoplastic or resilient-elastic binder to such fibers, winding thereof and curing the resulting workblanks allow to find a more efficient solution in creating strong and reliable multilayer structures. In known structures, the presence of high-strength fibers having their filaments bound weakly therein and embedded in a thermoplastic or resilient-elastic matrix or in a thermoset matrix leads to a premature destruction of filaments and fibers in the matrix due to high shear strains and stresses and, hence, to an incomplete realization of the high potential strength of the filaments per se and the fibers made of them. The known shells are formed of preimpregnated unidirectional fibers, but not cured prior to winding. According to the new concept of this invention, unidirectional fibers with a polymer thermoset binder applied thereto are cured completely already prior to winding, the resulting fibers formed as a rigid "skin-core" structure possess sufficient flexibility so that, after the thermoplastic or resilient-elastic binder is applied to them, they could be wound on curvilinear surfaces of the mandrel. The fibers having a rigid coating skin, when embedded in a thermoset or resilient-elastic matrix, efficiently cooperate with it; however, the same fibers having a rigid coating skin, when embedded in a rigid thermoset matrix, fail to attain such an efficient cooperation with it. According to the present invention, both the volume ratios of the high-modulus fiber as the core to the coating skin and the volume ratios of the fibers formed as a "skin-core" structure to the thermoplastic or resilient-elastic matrix ensure the highest strength and rigidity of tubular shells. In order to produce them, efficient control is required over the proportion of the binder at the step of applying it to the fibers. With the weight shares of the thermoset binder to the high-modulus fiber being 30–45%, integrity of coating is ensured on the fibers in the core, and with the weight shares of the thermoplastic or resilient-elastic binder applied to the fibers formed as a "skin-core" structure being 30–45%, integrity of the matrix and air-tightness of shells are ensured. With weight shares of the thermoset or resilient-elastic binder applied to the fibers formed as a "skin-core" structure being 50–83%, integrity of the matrix is ensured in the ribs of the shells having a rib-cellular structure. With the weight shares less than 30%, integrity of the matrix is not ensured, and with the weight shares of the thermoplastic or resilient-elastic binder being 50–83%, it is required to increase its viscosity in order that the binder will not flow out during impregnation of the fibers. The above-mentioned weight shares of the content of binders ensure the most efficient use thereof.

The above-mentioned weight ratios of binders and fibers, which are disclosed in the description of the methods, completely correspond to the volume ratios of fibers and binders in the shell embodiments discussed.

The above-mentioned distinguishing essential features are new for composite shells and methods of forming the same, and no cases of using them have been found in the state of prior art, and this allows to believe that the disclosed technical solutions and embodiments are novel and inobvious.

The unified combination of new essential features and those that are known to be common with prior art enables to solve the problem raised and attain the object put forth. The new technical solutions are a result of scientific research, test and evaluation activities and creative contribution on the basis of new concept of creating a multilayer air-tight structure and a multilayer rib-cellular structure which are produced by a nontraditional way, without the use of standard design and development work or any recommendations known in this field of aeronautics and rocketry, and by virtue of their orginality of non-obviousness they comply with the criterion of "Inventive Height".

DESCRIPTION OF THE DRAWINGS

FIG. 7 illustrates a set of strips 9, 10 and 11 forming a multilayer structure 8 shown in FIG. 3, FIG. 8 is a cross-sectional view through VIII—VIII of each strip 9, 10 and 11 shown in FIG. 7, FIG. 9 is a cross-sectional view of a unidirectional fiber 12 shown in FIG. 8, FIG. 10 is a general view of a composite rib-cellular shell structure shaped as a body of revolution, FIG. 11 is an end view of the shell along arrow 8, FIG. 16 is arrow C view of FIG. 10, showing a multilayer element 23, and FIG. 17 illustrates an outer multilayer coating 24 of the rib-cellular shell structure.

Detailed description of the preferred embodiment of this invention is given below with reference to the accompanying drawings.

DETAILED DESCRIPTION OF THE INVENTION

Figure 2:
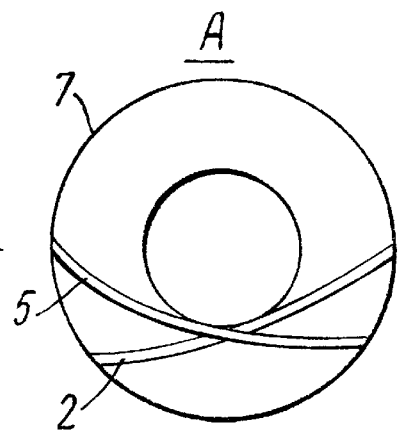
FIG. 2 is an end view of the shell along arrow A.
Figure 3:
FIG. 3 is scaled-up Section III—III of FIG. 1.
Figure 4:
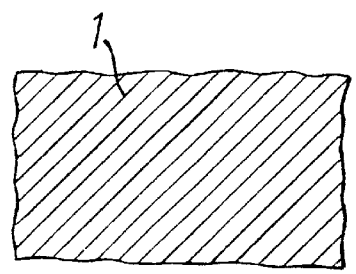
FIG. 4 is Section IV—IV of FIG. 3, characterizing the structure and location of the first plurality of multilayer elements 1.
Figure 5:
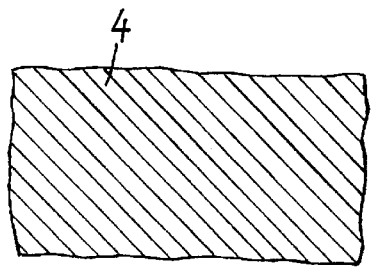
FIG. 5 is Section V—V of FIG. 3, characterizing the structure and location of the second plurality of multilayer elements 4.
Figure 6:
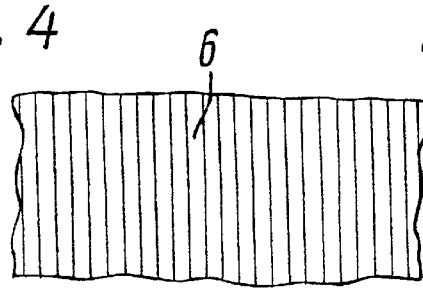
FIG. 6 is Section VI—VI of FIG. 3, characterizing the structure and location of the third plurality of multilayer elements 6.

A composite multilayer shell structure shaped as a body of revolution (FIGS. 1–9) comprises a first plurality of multilayer elements 1 (FIG. 4) arranged along spatial spirals 2 (FIG. 1) and having a common axis 3 and the same direction, a second plurality of multilayer elements 4 (FIG. 5) arranged along spatial spirals 5 (FIG. 1) and having a common axis essentially coinciding with said axis 3 of said spatial spirals 2 of said first plurality of multilayer elements 1, and the same direction opposite to said direction of said spatial spirals 2 of the first plurality of multilayer elements 1, a third plurality of multilayer elements 6 (FIG. 6) arranged along circumferences 7 (FIGS. 1 and 2) which have the centers thereof essentially lying on said axis 3 of the spatial spirals 2 of said first plurality of multilayer elements 1 to form a multilayer structures 8 (FIG. 3) by a set of strips 9, 10 and 11 (FIG. 7) each of which comprises unidirectional fibers 12 bound by a polymer binder 13 (FIG. 8). Each unidirectional fiber 12 (FIG. 8) of each strip 9, 10 and 11 (FIG. 7) of said set is made as a "skin-core" structure in which the skin 14 (FIG. 9) is made of a thermoset epoxy-containing binder and in which the core 15 (FIG. 9) is made of a high-modulus fiber. The unidirectional fiber 12 (FIG. 9) made as a "skin-core" structure in each strip 9, 10 and 11 (FIG. 7) of said set of strips which form the multilayer structure 8 (FIG. 3) of said first, second and third pluralities of multilayer elements 1, 4 and 6 (FIGS. 4, 5 and 6) is made to have a volume ratio of the core 15 and the skin 14 (FIG. 9) from 1:0.3 to 1:0.45. The polymer binder 13 which binds the plurality of unidirectional fibers 12 (FIG. 8) made as a "skin-core" structure in each strip 9, 10 and 11 (FIG. 7) of said set of strips which form the multilayer structure 8 (FIG. 3) of said first, second and third pluralities of multilayer elements 1, 4 and 6 (FIGS. 4, 5 and 6) is made as a thermoplastic binder of thermoplast type or a resilient-elastic binder of rubber or polyurethane type. The unidirectional fibers 12 (FIG. 8) made as a "skin-core" structure (FIG. 9) in each strip 9, 10 and 11 (FIG. 7) of said set of strips which form the multilayer structure 8 (FIG. 3) of said first, second and third pluralities of multilayer elements 1, 4 and 6 (FIGS. 4, 5 and 6), and the polymer binder 13 (FIG. 8) which binds them and is a thermoplastic binder of thermoplast type or a resilient-elastic binder of rubber or polyurethane type are made to have a volume ratio of 1:0.3 to 1:0.45.

Figure 12:
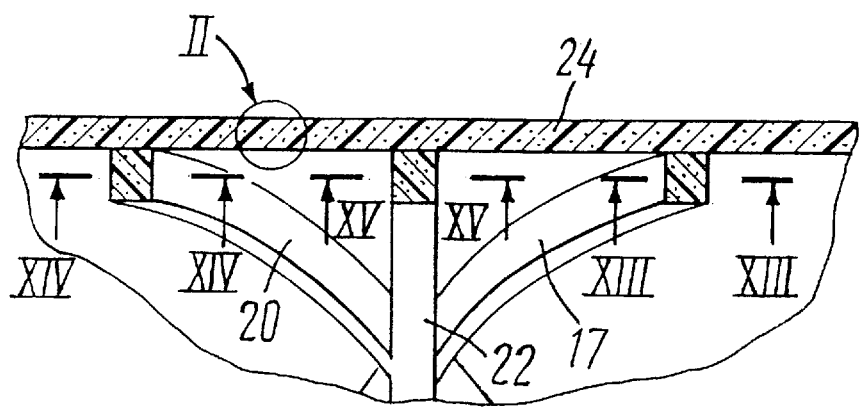
FIG. 12 is scaled-up Section XII—XII of FIG. 10.
Figure 13:
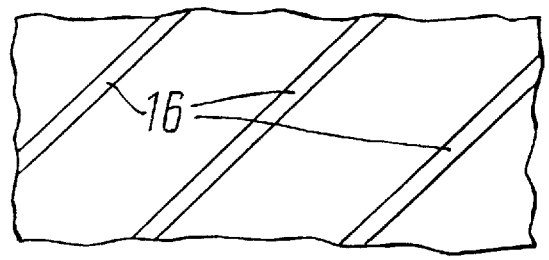
FIG. 13 is scaled-up Section XIII—XIII of FIG. 10 along ribs having the same direction.
Figure 14:
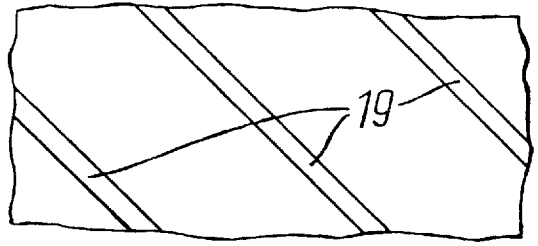
FIG. 14 is scaled-up Section XIV—XIV of FIG. 10 along ribs having another direction.
Figure 15:
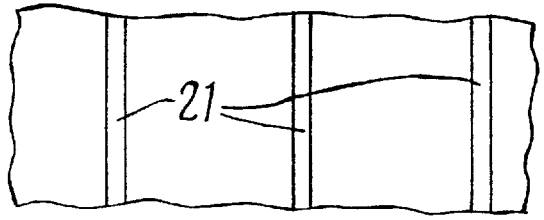
FIG. 15 is scaled-up Section XV—XV of FIG. 10 along annular ribs.

A composite shell shaped as a body of revolution and having a rib-cellular structure (FIGS. 10–17) comprises a first plurality of multilayer elements 16 (FIG. 13) arranged along spatial spirals 17 (FIGS. 10 and 12) and having a common axis 18 and the same direction, including a plurality of multilayer elements 19 (FIG. 14) arranged along spatial spirals 20 (FIGS. 10 and 12) and having a common axis essentially coinciding with said axis 18 of said spatial spirals 17 of said first plurality of multilayer elements 16, and the same direction opposite to said direction of said spatial spirals 17 of said first plurality of multilayer elements 16, a third plurality of multilayer elements 21 (FIG. 15) arranged along circumferences 22 (FIGS. 11, 10 and 12) which have the centers thereof essentially lying on said axis 18 of said spatial spirals 17 of said first plurality of multilayer elements 16. A multilayer rib-cellular structure 23 (FIG. 16) consisting of said first, second and third pluralities of multilayer elements, 16, 19 and 21 (FIGS. 13, 14 and 15) is formed by a set of strips 9, 10 and 11 (FIG. 7), each strip 9, 10 and 11 (FIG. 7) of said set of strips is formed of a plurality of unidirectional fibers 12 bound by a polymer binder 13 (FIG. 8), each unidirectional fiber 12 (FIG. 8) of each strip 9, 10 and 11 (FIG. 7) of said set of strips is made as a "skin-core" structure, the skin 14 (FIG. 9) of each unidirectional fiber 12 made as a "skin-core" structure in each strip 9, 10 and 11 (FIG. 7) of said set of strips which forms the multilayer rib-cellular structures 23 (FIG. 16) of said first, second and third pluralities of multilayer elements 16, 19 and 21 (FIGS. 13, 14 and 15) is made of a thermoset epoxy-containing binder, the core 15 (FIG. 9) of each unidirectional fiber 12 (FIG. 8) made as a "skin-core" structure in each strip 9, 10 and 11 (FIG. 7) of said set of strips which forms the multilayer rib-cellular structure 23 (FIG. 16) of said first, second and third pluralities of multilayer elements 16, 19 and 21 (FIGS. 13–15) is made of high-modulus fibers. The unidirectional fiber 12 made as a "skin-core" structure in each strip 9, 10 and 11 of said set of strips (FIG. 16) which forms the multilayer rib-cellular structure 23 of said first, second and third pluralities of multilayer elements 16, 19 and 21 (FIGS. 13–15) is made to have a core-to-skin volume ratio from 1:0.3 top 1:0.45. The polymer binder 13 which binds the plurality of unidirectional fibers 12 (FIG. 8) made as a "skin-core" structure in each strip 9, 10 and 11 (FIG. 7) of said set of strips which forms the multilayer rib-cellular structure 23 (FIG. 16) of said first, second and third pluralities of multilayer elements 16, 19 and 21 (FIGS. 13–15) is made as a thermoplastic binder of thermoplast type or a resilient elastic binder of rubber or polyurethane type. The unidirectional fibers 12 made as a "skin-core" structure in each strip 9, 10 and 11 of said set of strips which forms the multilayer rib-cellular structure 23 (FIG. 16) of said first, second and third pluralities of multilayer elements 16, 19 and 21 (FIGS. 13–15), and the polymer binder 13 which binds them and is a thermoplastic binder of thermoplast type or a resilient-elastic binder of rubber or polyurethane type are made to have a volume ratio of 1:1 to 1:1.2. The rib-cellular structure is provided with a multilayer coating 24 (FIGS. 10 and 12) applied thereto and made of a fourth plurality of multilayer elements 25 (FIG. 17) made of a set of strips 9, 10 and 11 (FIG. 7) arranged along spatial spirals 2, 5 and 7 (FIG. 1) or their combination, each of which is formed by a plurality of unidirectional fibers 12 made as a "skin-core" structure and bound by a polymer binder 13 (FIG. 8) which is a thermoplastic binder or a resilient-elastic binder of thermoplast type and rubber or polyurethane type, respectively, with a volume ratio of the fiber made as a "skin-core" structure and the binder being from 1:0.3 to 1:0.45.

Figure 1:
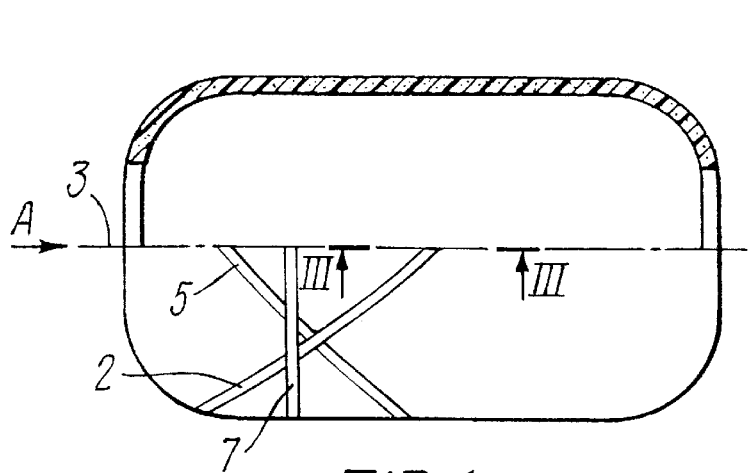
FIG. 1 is a general view of a composite multilayer shell structure shaped as a body of revolution.

A method of forming composite shells consists in applying a thermoset epoxy-containing binder 14 (FIG. 9) to a high-modulus fiber 15, with the weight of the binder being equal to 30–45% of the weight of the high-modulus fiber 15, curing the epoxy-containing binder on the high-modulus fiber 15 in accordance with the high-temperature conditions for polymerization of said epoxy-containing binder 14 so that a rigid unidirectional fiber 12 made as a "skin-core" structure (FIG. 9) is thus produced; producing strips 9, 10 and 11 (FIG. 7) by forming them of a plurality of unidirectional fibers 12 formed as a "skin-core" structure; applying thereto a thermoplastic binder 13 (FIG. 18) of thermoplast type or a resilient-elastic binder of rubber or polyurethane type, with the weight thereof equal to 30–45% of the weight of the strip 9, 10 or 11 formed of a plurality of unidirectional fibers 12 formed as a "skin-core" structure for producing the shells (FIGS. 1–9) (of the first type) or with the weight thereof equal to 50–83% of the weight of the strip 9, 10 or 11 formed of a plurality of unidirectional fibers 12 formed as a "skin-core" structure for producing ribs of the shells (FIGS. 16–17), forming a workblank of the shell (FIG. 1 or FIG. 10) by winding with said strips under tension on a mandrel correspondingly a first, a second and a third pluralities of multilayer elements 1, 4 and 6 (FIGS. 4–6) so as to orient them along spirals 2 and 5 and along circumferences 7 (FIG. 1) or a first, a second and a third pluralities of multilayer elements 16, 19 and 21 (FIGS. 13–15) so as to orient them along spirals 17 and 19 at intervals and along circumference 22 (FIGS. 10 and 12); winding under tension the strips 9, 10 and 11 formed of a plurality of unidirectional fibers 12 formed as "skin-core" structures with a thermoplastic or resilient-elastic binder 13 of thermoplast type and rubber or polyurethane type, respectively, applied thereof on a multilayer structure 23 (FIG. 16) formed of the first, the second or the third pluralities of multilayer elements 16, 19 and 21 (FIGS. 13–15) for producing thereon an outer shell 24 (FIG. 12) made of a fourth plurality of multilayer elements 25 (FIG. 17), the set of strips 9, 10 or 11 can be arranged along spatial spirals 2, 5 or 7 (FIG. 1) or made as their combination for a shell (FIGS. 10–17) containing a rib-cellular structure, wherein the percentage of the thermoplastic or resilient-elastic binder of thermoplast type and rubber or polyurethane type, respectively, applied to the strips 9, 10 or 11 is maintained equal to 30–45% of the weight of the unidirectional fibers 12 therein formed as "skin-core" structures; forming a shell (of the first type) by heat treating said workblank of the multilayer structure (FIGS. 1–9) after forming the first, the second and the third pluralities of multilayer elements 8, and a shell having a multilayer rib-cellular structure (FIGS. 10–17) after forming the fourth plurality of multilayer elements 25 of the outer shell 24, the shells of both types being formed on the mandrel, in accordance with the temperature conditions for curing said polymer binder 13 (FIG. 8) with which the strips 9, 10 and 11 (FIG. 7) are impregnated that are formed by a plurality of unidirectional fibers 12 formed as "skin-core" structures; and removing the mandrel out of said shell. Along with this, it is necessary to point out that, in order to produce highly efficient multilayer shell structures (FIGS. 1–9), it is most practical technologically and optimal for ensuring their strength and air-tightness to apply 30–45% of the binder 13 for the first, the second and the third pluralities of multilayer elements 1, 4 and 6. In order to produce highly rigid and strong shells having a rib-cellular structure, it is most efficient to apply 50–83% of the binder 13 for the first, the second and the third pluralities of multilayer elements 16, 19 and 21 (FIGS. 10–16) and to apply 30–45% of the binder 13 for the fourth plurality of multilayer elements 25 of the outer shell 24 (FIG. 1 and FIG. 17). If excessive quantity of the binder 13 is applied, this will cause troubles in technological processing of fibrous material and lead to higher losses thereof.

As the thermosetting binder 14 (FIG. 9), use was made of an epoxy-containing binder of epoxychlordiane resin type. As the high-modulus fibers 15 for the multilayer shell structures (FIGS. 1–9) and the outer shell 24 for the shell having a rib-cellular structure (FIG. 17), use was made of an aramide fiber. As the high-modulus fibers 15 of the multilayer elements 16, 19 and 21 for the shells having a multilayer rib-cellular structure (FIGS. 10–16), use was made of a carbon fiber.

In loading the disclosed shell embodiments, cooperation of the unidirectional fibers 12 with the binder 13 is effected as follows.

Each unidirectional fiber 12 consisting of high-modulus fibers 15 has a bundle of elementary filaments bound by a thermosetting epoxy-containing binder, and this allows to create an integral rigid "skin-core" structure, the fiber 12 has an adequate flexibility in the longitudinal direction to enable its processing into the product, the fiber 12 and the filaments embedded therein do not break when transverse shearing strains and stresses emerge in this fiber, and work within the range of strains and stresses that emerge. Since the matrix—the polymer binder 13—is thermoplastic (the first embodiment) or resilient-elastic (the second embodiment), i.e., when loaded, the shell is sufficiently compliant to take up shearing strains, the fibers 12 provided with rigidity and strength respond to these strains by their elastic bending up to the highest limits of loading.

The tests of 400 mm diameter shells having a multilayer structure (FIGS. 1–9) and 1600 mm shells having a multilayer rib-cellular structure (FIGS. 10–17) have confirmed their high strength, air-tightness and reliability. The 400 mm diameter shells have been tested for internal pressure, and the 1600 mm diameter shells (FIGS. 10–17) have been tested for compression in the axial direction. Implementation of the disclosed technical solutions allows to produce high-quality products for body members of flying vehicles.

Thus, the new technical solutions described herein above as far as design and method of implementation in alternative embodiments thereof disclosed hereby are concerned are novel, technologically acceptable and efficient as compared against the prior art.

It should be understood that the scope of the invention now disclosed is to be conceived wider than the particular embodiment given in this patent specification, in the set of patent claims and in the accompanying drawings. It should be borne in mind that the form in which the embodiments of this invention are presented herein are merely some probable preferred modes for carrying out the invention and that various other alternative embodiments of the invention can be used in what concerns the shape, dimensions and location of individual elements thereof if all this does not reach beyond the scope of the invention as set forth in the patent claims.

Moreover, the invention now disclosed is not limited in its use only to the shells for flying vehicles and can be used also in other fields where it is required to use composite shells shaped as bodies of revolution and featuring improved strength, air-tightness and reliability and other properties such as described in the material evidence pertaining to this application.

What is claimed is:

1. A composite shell comprising:
   a shell formed of a plurality of strips of composite material wound about a longitudinal axis of the shell along a plurality of spiral and circumferential directions so as to form a plurality of layers;
   each of the strips being formed of a plurality of unidirectional fibers, each fiber comprising an outer layer of a thermosetting epoxy-containing binder surrounding a core formed as a bundle of filaments bound together by said thermosetting epoxy-containing binder, the fibers extending lengthwise along the strip and being bound together by a polymer binder having a relatively lower stiffness than that of the thermosetting epoxy-containing binder.

2. The composite shell of claim 1, wherein each unidirectional fiber has a ratio of volume of filaments to volume of thermosetting epoxy-containing binder between about 1:0.3 and 1:0.45; and
   each strip has a ratio of volume of the unidirectional fibers to volume of the polymer binder between about 1:0.3 and 1:0.45.

3. The composite shell of claim 1, wherein the strips are wound along spiral directions at a first spiral angle to form a first plurality of multilayer elements, along spiral directions at a second spiral angle of opposite sense to the first spiral angle to form a second plurality of multilayer elements, and along circumferences of the shell to form a third plurality of multilayer elements.

4. The composite shell of claim 1, wherein the polymer binder comprises a thermoplastic binder.

5. The composite shell of claim 1, wherein the polymer binder comprises a rubber-type binder.

6. The composite shell of claim 1, wherein the polymer binder comprises a polyurethane-type binder.

7. The composite shell of claim 1, wherein the filaments making up the core of each unidirectional fiber are formed of carbon.

8. The composite shell of claim 1, wherein the filaments making up the core of each unidirectional fiber are formed of aramid.

9. A composite shell comprising:
   a shell having a rib-cellular structure formed from a plurality of strips of composite material wound at intervals about a longitudinal axis of the shell along a plurality of spiral and circumferential directions so as to form intersecting spiral and circumferential ribs; and
   an outer coating formed by a plurality of said strips wound about said shell of rib-cellular structure;
   each of the strips being formed of a plurality of unidirectional fibers, each fiber comprising an outer layer of a thermosetting epoxy-containing binder surrounding a core formed as a bundle of filaments bound together by said thermosetting epoxy-containing binder, the fibers extending lengthwise along the strip and being bound together by a polymer binder having a relatively lower stiffness than that of the thermosetting epoxy-containing binder;
   each unidirectional fiber having a ratio of volume of filaments to volume of thermosetting epoxy-containing binder between about 1:0.3 and 1:0.45; and
   each strip having a ratio of volume of the unidirectional fibers to volume of the polymer binder between about 1:1 and 1:2.

10. The composite shell of claim 9, wherein the polymer binder comprises a thermoplastic binder.

11. The composite shell of claim 9, wherein the polymer binder comprises a rubber-type binder.

12. The composite shell of claim 9, wherein the polymer binder comprises a polyurethane-type binder.

13. The composite shell of claim 9, wherein the filaments making up the core of each unidirectional fiber are formed of carbon.

14. The composite shell of claim 9, wherein the filaments making up the core of each unidirectional fiber are formed of aramid.

* * * * *

UNITED STATES PATENT AND TRADEMARK OFFICE
CERTIFICATE OF CORRECTION

PATENT NO. : 6,077,580
DATED : June 20, 2000
INVENTOR(S) : Vasiliev et al.

It is certified that error appears in the above-identified patent and that said Letters Patent is hereby corrected as shown below:

Title page, [30] Foreign Application Priority Data, line 1, "961288125" should read --96112881/25--; line 2, "961288325" should read --96112883/25--; line 3, "961288725" should read --96112887/25--.

Signed and Sealed this

Third Day of April, 2001

*Attest:*

NICHOLAS P. GODICI

*Attesting Officer*  Acting Director of the United States Patent and Trademark Office